United States Patent [19]

Peters

[11] 4,371,631
[45] Feb. 1, 1983

[54] BACKING PLATE COMPOSITION FOR BRAKE SHOES

[75] Inventor: Walter B. Peters, Englewood, Colo.

[73] Assignee: Manville Service Corporation, Denver, Colo.

[21] Appl. No.: 289,142

[22] Filed: Aug. 3, 1981

[51] Int. Cl.³ .......................... C08J 5/14; C08L 7/00; C08L 9/00; C08L 61/10
[52] U.S. Cl. .................................... 523/153; 523/156; 525/139; 524/509; 260/998.13
[58] Field of Search ................ 260/2.3, 38 R, 998.13, 260/DIG. 39, 42.18; 525/139

[56] References Cited

U.S. PATENT DOCUMENTS

| | | | |
|---|---|---|---|
| 2,885,037 | 5/1959 | Wilson | 260/DIG. 39 |
| 2,901,456 | 8/1959 | Spokes et al. | 260/DIG. 39 |
| 2,940,556 | 6/1960 | Jensen et al. | 260/DIG. 39 |
| 3,832,325 | 8/1974 | Eschen | 260/DIG. 39 |
| 4,130,537 | 12/1978 | Boher | 260/38 |
| 4,187,209 | 2/1980 | Searfoss et al. | 260/38 |
| 4,217,255 | 8/1980 | Griffith | 523/156 |
| 4,219,452 | 8/1980 | Littlefield | 523/156 |
| 4,226,758 | 10/1980 | Sumira | 523/156 |

FOREIGN PATENT DOCUMENTS 242558 12/1960 Australia ............................ 523/156

Primary Examiner—Allan Lieberman
Attorney, Agent, or Firm—Robert M. Krone; Gregory W. O'Connor

[57] ABSTRACT

A sound attenuating composition for use as a molded-in backer stock between a brake backer plate and the wear stock of a brake shoe comprising approximately in percent by volume:
 non-fibrous organic components = 15–40%
 fiber reinforcement = 20–50%
 inorganic components = 15–50%
 phenolic resin = 5–10%.

6 Claims, No Drawings

BACKING PLATE COMPOSITION FOR BRAKE SHOES

BACKGROUND OF THE INVENTION

This invention relates to compositions for use with molded brake shoes and in particular to a composition for backer stock material that goes between the wear stock or friction material and the metal backer plate of a brake shoe. In particular the backer stock composition is particularly well adapted for heavy duty service such as encountered by brake shoes in railroad service.

Molded composition brake shoes for railroad service such as the products disclosed in U.S. Pat. No. 2,686,140; 2,681,964; 3,152,099; 3,390,113; 3,832,325; 3,959,194 and 4,178,278 and others have employed friction materials suitable for railroad service which are molded to the metal backer plate of a railroad brake shoe by the use of a backer plate composition which is molded with the friction material against the metal backer plate providing a bond between the backer plate and the friction material.

Backer stock used in this manner with the friction material or wear stock and the metal backer plate has been used in the past to provide a satisfactory bond between the wear stock and the metal backer plate since friction compositions for wear stock are not always easily bonded directly to the metal backer plate in a manner that is entirely suitable for railroad service use. Other backer stock utilized in this application is available which is adhesively applied to the wear stock instead of being molded in place and therefore need not embody the properties required for adhesion during the molding process.

The properties of a backer stock necessary for railroad applications therefore requires that it be capable of adhering strongly to the metal backer plate as well as becoming an integral part of the rear surface of the wear stock nearest to the metal backer plate. It is also important that the backer stock be somewhat flexible or softer than the friction stock. It is also highly desirable that the backer stock be capable of exhibiting sound dampening properties in service. These properties have been achieved in the past by the use of compositions which contained substantial quantities of asbestos fiber. The properties of the prior backer stock material including the superior strength and resistance to heat degredation provided by the asbestos fiber reinforcement has been difficult to obtain using compositions not containing asbestos fiber. It has been desirable, however, to provide compositions which are free of asbestos fiber while still being capable of meeting the requirements for railroad brake shoe service.

In addition, environmental concerns, have imposed an additional criteria that railroad brake shoes in service, be constructed to perform in a manner which would reduce the sound inevitably associated with the application of brake shoe friction materials against the rim of a metal railroad wheel. Finally, economic considerations have required that the foregoing properties and objectives has to be achieved without the use of asbestos reinforcing fibers in a manner which utilizes current molding equipment generally employed for the manufacture of railroad brake shoes in order to provide a product having a manufacturing cost which can make it attractive for use in railroad service.

It is therefore an objective of the present invention to provide a backer stock material which can be incorporated into existing production equipment in the fabrication of brake shoes for heavy duty railroad and AAR (Association of American Railroads) service which is capable of bonding adequately to the friction material used and to the backer plate of a railroad brake shoe by utilizing conventional molding and adhesive techniques, while providing an asbestos-free material which provides superior sound attenuation during use.

BRIEF SUMMARY OF THE INVENTION

The invention herein is a backing plate composition suitable for railroad use which comprises in percent by volume, non-fibrous organic components 15–40%, inorganic components 15–50%, fiber reinforcements 20–50% and phenolic resins 5–10%.

The asbestos-free backer stock of the present invention is used in the interface between the friction material or wear stock and the metal backer plate of a brake shoe employed in various railroad service applications and can be blended and molded by conventional techniques with existing manufacturing equipment to provide a material which not only performs satisfactorily in railroad service but improves the overall utility of the brake shoe combination by virtue of its superior sound attenuating properties in use.

DETAILED DESCRIPTION OF THE INVENTION

The foregoing objects and advantages for a molded backer stock composition as described herein can be obtained using the following most preferred composition by: chopped tire friction stock 41.64%, chopped fiberglas 6.07%, rubber makers hard clay 20.61%, anhydrous alkali alumino silicate 20.61%, TMTD rubber accelerator 0.24%, MBT rubber accelerator 0.24%, rubber makers sulfur 0.35%, zinc oxide 1.51%, and powdered phenol formaldehyde resin 6.91%.

The foregoing composition preferably employs a commercially available reinforcing fiber which is essentially the by-product of the process for making fiber reinforced rubber tires. It is essential that the material contain reinforcing fibers of rayon, nylon or polyester and that the material be chopped or shredded or otherwise reduced to a size which will facilitate blending with the remainder of the components of the composition described herein. In addition to the fiber contained in the tire stock, short lengths of chopped fiberglass strands are incorporated into the composition in the amounts disclosed and mixed with the remainder of the materials for use as a molding composition for backer stock applications. Typically, the fibers can be as short as ½ inch or as long as 1¼ inches in length.

The foregoing composition conventionally consists of rubber or mixtures of rubber and phenolic resins. Such resins are manufactured either synthetically or can be obtained from cashew nut shell oil. Such resins and their method of preparation and use are disclosed in the previously mentioned U.S. Pat. Nos. 2,686,140 and 2,861,964 which are incorporated herein by reference. The cashew nut shell resin, preferably in powdered form, will be present in the composition of the present invention in from about 5% to 10% by volume with six to six and one-half percent by volume being preferred in the final composition.

The rubbers utilized in the present invention can be selected as previously described from a wide range of materials but are preferably obtained in the form of commercially available chopped tire stock in a composition where further rubber curing components such as TMTD or tetramethylthiuramdisulfide; MBT or (2 mercaptobenzolthiazole) and rubber-makers sulfur are employed in the amounts disclosed for providing the preferred density of from between 1.6–1.9 grams per cubic centimeter and shear strength greater than 3000 psi by ASTM-D-732 in the final molded composition. The additional fiber component is preferably about 5 to 25% by volume of one-quarter inch chopped fiberglass which is commercially obtained but this fiber can be replaced if desired by the use of mineral wool or fiber, or with cotton linters preferably No. 115, in a modified composition. In addition, approximately 40% by weight of the tire stock is also fiber which is considered as part of the fiber component of the present composition.

Additional rubber compounds can be employed to modify the molding and final characteristics of the composition. These can preferably include styrene-butadiene rubbers such as SBR 1502 and SBR 1012 which can be obtained from Goodyear Tire and Rubber Company. However, other natural or synthetic resins are readily available and widely described in the literature such as the *Vanderbilt Rubber Handbook* published by the R. T. Vanderbilt Company in 1968. The final materials required in the present invention are the additives used to vulcanize, cure or otherwise modify the resins in the organic component of the composition of the present invention. The selection of these materials will naturally vary depending upon the nature of the particular organic component used but in general will include such materials as sulphur, zinc oxide, thiazoles, and the like. The final composition may also include minor amount of antioxidants, retarders and other processing aids which are described fully in the previously identified patent literature.

The final composition may be molded using a variety of techniques depending on the particular application and available equipment. Preferably, the molding techniques employed are those described in detail in the aforementioned patents whose disclosures are incorporated herein by reference.

The preferred and most preferred compositions of the present invention are set out in Tables 1 and 2.

TABLE I

|  | PERCENT BY VOLUME |
|---|---|
| Chopped Tire Friction Stock | 41.64 |
|  | 35–45 |
| SBR Rubber | 0–10 |
| Additional Fiber Reinforcement | 21.07 |
|  | 5–25 |
| Rubber Makers Hard Clay | 15.79 |
|  | 15–25 |
| Additional Inorganic Filler | 0–25 |
| TMTD Rubber Accelerator | 0.22 |
|  | 0.20–0.25 |
| MBT Rubber Accelerator | 0.20 |
|  | 0.18–0.22 |
| Rubber Makers Sulfur | 0.37 |
|  | 0.35–0.40 |
| Zinc Oxide | 1.33 |
|  | 1.0–1.5 |
| Carbon Black | 1.56 |
|  | 1.50–1.60 |
| Powdered Phenol Formaldehyde Resin | 6.15 |
|  | 5–10 |

TABLE II

|  | PERCENT BY VOLUME |
|---|---|
| Chopped Tire Friction Stock | 41.64 |
| ¼" Impregnated Chopped Fiberglass Strand | 6.07 |
| SBR 1502 (Crumb Rubber with 10% Talc) | 1.82 |
| Rubber Maker's Hard Clay | 20.61 |
| Anhydrous Alkali Alumino Silicate Filler | 20.61 |
| TMTD Rubber Accelerator | 0.24 |
| MBT Rubber Accelerator | 0.24 |
| Rubber Maker's Sulfur | 0.35 |
| Zinc Oxide | 1.51 |
| Powdered Phenol Formaldehyde Resin | 6.91 |
| Total | 100.00 |

The following physical properties in Table II are achieved with the most preferred molded-in backer stock composition of Table I.

TABLE III

| | PHYSICAL PROPERTIES | |
|---|---|---|
| Property | Typical Values | Test Method |
| (gm/cc at 25° C.) | 1.77 | ASTM-D-1622 |
|  | 1.60–1.90 |  |
| Hardness |  |  |
| Rockwell | 48 |  |
| Shore D | 68 | ASTM-D-2240 |
| Shear Strength | about 50 |  |
| (psi) | 3266 | ASTM-D-732 |
|  | greater than 3000 psi |  |

These properties compare favorably with the properties normally achieved with asbestos reinforced materials previously used while providing an additional sound attenuating capability not hitherto obtained.

While this invention has been described with respect to specific compositions and ranges it will be understood that other materials can be substituted in the same or different amounts to achieve the desired properties found in the composition of the present invention. The scope of this invention should therefore only be limited by the following claims.

What is claimed is:

1. An asbestos-free sound attenuating backer plate composition capable of being directly molded between the metal backer plate and the friction material of tread-type railroad brake shoe and providing adhesion therebetween comprising by volume;

between 35–45% of organic fiber reinforced rubber tire friction stock, wherein said tire friction stock contains about 40% by weight of rayon, nylon or polyester fibers, and said tire friction stock is present in a size which facilitates blending with the other components of said backer plate composition;

between 5–25% additional chopped or shredded reinforcing fiber comprising fiber glass or mineral wool or cotton linters;

between 15–25% rubber makers hard clay;

between 15–25% anhydrous alumino silicate;

between 5–10% phenolic resin with the balance comprising rubber curing accelerators; zinc oxide and carbon black and wherein the rubber curing component and the additional reinforcing fiber are present in sufficient amounts to provide adequate shear strength for use as backer plate having a density in the finished product of from between 1.6 to 1.9 gm/cc at 25 degree C.

2. The composition of claim 1 wherein said phenol formaldehyde resin comprises cashew nut shell resins.

3. The composition of claim 2 wherein said rubber curing accelerators include, tetramethylthiuramdisulfide, 2-mercaptobenzolthiazole; and rubber makers sulfur.

4. The composition of claim 3 wherein said reinforcing fiber is chopped glass filament fibers in approximately one-quarter inch lengths.

5. An asbestos-free sound attenuating backer plate composition capable of being directly molded between the metal backer plate and the friction material of a tread-type railroad brake shoe and providing adhesion therebetween consisting essentially of by volume:
- 35–45% chopped tire friction stock wherein said chopped tire friction stock contains about 40% by weight of rayon, nylon or polyester fibers, and wherein said chopped tire friction stock is present in a size which facilitates blending with the other components of said backer plate composition;
- 0–10% SBR rubber
- 5–25% additional chopped or shredded fiber reinforcement comprising fiber glass or mineral wool or cotten linters;
- 15–25% rubber makers hard clay;
- 0–25% additional inorganic filler;
- 0.35–0.40% rubber makers sulfur;
- 1.0–2.0% zinc oxide;
- 0–1.6% carbon black; and
- 5–10% phenol formaldehyde resin;

with the balance being rubber accelerators; the amount of SBR rubber; additional fiber reinforcement; rubber makers hard clay; additional inorganic filler and phenol formaldehyde resin being selected to produce in the finished molded backer plate a density of from between 1.6–1.9 gm/cc at 25 degrees C.; and a Rockwell hardness of about 50 by ASTM-D-2240.

6. An asbestos-free sound attenuating backer plate composition capable of being directly molded between the metal backer plate and the friction material of the tread-type railroad brake shoe and providing adhesion therebetween consisting essentially of by volume:
- chopped tire friction stock wherein said chopped tire friction stock contains about 40% by weight of rayon, nylon or polyester fibers, and wherein said chopped tire friction stock is present in a size which facilitates blending with the other components of said backer plate composition 41.64%;
- chopped glass fibers 6.07%;
- 1502 SBR crumb rubber with 10% talc 1.82%; rubber maker's hard clay 20.61%;
- anhydrous alkali alumino silicate 20.61%;
- phenol formaldehyde resin 6.91%;
- with the balance being rubber curing and accelerating agents in sufficient amounts, together with the foregoing, to be molded into a backer plate having a density between 1.6 to 1.9 gm/cc at 25 degrees C.; a shear strength of greater than 3000 psi by ASTM-D-732, and a Rockwell hardness of about 50 by ASTM-D-2240.

* * * * *